(12) United States Patent
Dal

(10) Patent No.: US 11,204,198 B2
(45) Date of Patent: Dec. 21, 2021

(54) VERTICAL RING SHAFT KILN

(71) Applicant: Cevdet Dal, Istanbul (TR)

(72) Inventor: Cevdet Dal, Istanbul (TR)

( * ) Notice: Subject to any disclaimer, the term of this patent is extended or adjusted under 35 U.S.C. 154(b) by 254 days.

(21) Appl. No.: 16/461,592

(22) PCT Filed: Nov. 21, 2016

(86) PCT No.: PCT/TR2016/050456
§ 371 (c)(1),
(2) Date: May 16, 2019

(87) PCT Pub. No.: WO2018/093341
PCT Pub. Date: May 24, 2018

(65) Prior Publication Data
US 2019/0368813 A1 Dec. 5, 2019

(51) Int. Cl.
F27B 1/00 (2006.01)
C04B 7/44 (2006.01)
F27D 19/00 (2006.01)
F27D 99/00 (2010.01)
F27B 1/24 (2006.01)

(52) U.S. Cl.
CPC ............ F27B 1/005 (2013.01); C04B 7/4469 (2013.01); F27B 1/24 (2013.01); F27D 19/00 (2013.01); F27D 99/0033 (2013.01); F27D 2019/0003 (2013.01); F27D 2019/0059 (2013.01)

(58) Field of Classification Search
CPC ... C04B 7/4469; F27D 19/00; F27D 99/0033; F27D 2019/0003; F27D 2019/0059; F27B 1/005; F27B 1/24; F27B 1/26

USPC .......................................................... 432/96
See application file for complete search history.

(56) References Cited

U.S. PATENT DOCUMENTS

| 3,202,405 | A | * | 8/1965 | Stanley | .................. F27B 1/005 |
| | | | | | 432/17 |
| 2012/0064472 | A1 | | 3/2012 | Yoshii | |
| 2015/0275107 | A1 | * | 10/2015 | Wang | ......................... C10J 3/20 |
| | | | | | 110/229 |
| 2018/0160486 | A1 | * | 6/2018 | Chiang | .................... F27D 3/14 |

FOREIGN PATENT DOCUMENTS

DE 2312538 A1 * 9/1974
JP 2006064206 A 3/2006

OTHER PUBLICATIONS

Written Opinion of ISA and International Search Report for PCT/TR2016/050456.

* cited by examiner

Primary Examiner — Steven B McAllister
Assistant Examiner — Charles R Brawner
(74) Attorney, Agent, or Firm — Egbert, McDaniel & Swartz, PLLC

(57) ABSTRACT

Invention relates to a vertical ring shaft kiln comprising a vertical burning region (1); an intermediate sintering zone ($Z_3$) surrounded by a first wall (10) and an opposite second wall (20) at the burning region (1) to obtain a clinker from a particulate raw material flowing downwards direction.

5 Claims, 4 Drawing Sheets

VERTICAL RING SHAFT KILN

TECHNICAL FIELD

The present invention relates to a vertical ring shaft kiln for transforming downwards flowing calcination, sintering and drying of any kind of materials, minerals etc., particularly cement raw material into the clinker form.

PRIOR ART

Vertical shaft kilns are known for treating lime or similar materials wherein calcination, roasting or sintering of granulated and particulate material through an annular material passage. During the heating of the material over burned or unburned spots occur inside the material as the passage through the kiln occurs. Therefore, sintering efficiency of such vertical shaft kilns are notoriously low considering the output including high amount of low quality material. Consequently a high percentage of the cement producers (or producers of these types of materials) prefer rotary kilns.

Conventional vertical shaft kilns suffer from production capacities are limited e.g. maximum 300 tons/day. Due to an uncontrolled burning zone development in the center of the sintering zone, production output includes high amount of unburned material.

BRIEF SUMMARY OF THE INVENTION

The object of the invention is to eliminate bottlenecks of the conventional vertical ring shaft kilns such as bad efficiency due to the uncontrolled burning zones and limited capacity due to the above explained disadvantages.

In order to achieve the above objective, the invention provides a vertical ring shaft kiln comprising a vertical burning region having an intermediate sintering zone defined by a first wall and an opposite second wall at the vertical burning region characterized in that a gap between the first wall and the second wall has a length in a predetermined distance wherein the first wall and second wall are formed in a ring shape one inside the other.

A predetermined distance, i.e. the length of a gap between the first wall and the second wall throughout the vertical burning zone, namely a drying, calsining, sintering, clinkerizing and gasification zone, particularly the intermediate sintering zone is arranged so that a heat distribution pattern inside the drying, calsining, sintering, clinkerizing and gasification zone is homogeneously transform complete flowing raw material into the clinker form. The heat distribution inside the drying, calsining, sintering, clinkerizing zone is provided by heat of the raw material itself by burning a fuel bonded to the raw material or additional external burners arranged through the drying, calsining, sintering, clinkerizing and gasification zone activated upon necessity. Predetermined downwards flowing speed can be adjusted by controlled delivery of the clinker material into a roller crusher or using a different known method. The raw material is particularly cement raw material. The distance between the first wall and the second wall is set by a predetermined configuration of the length of the gap between the first wall and the second wall which are parallel or substantially parallel to each other.

In a preferred embodiment, the first wall and second wall are formed in a ring shape one inside the other. Ring shape is any closed geometry, such as annular, polygonal etc. A preferred ring shape is an outer tubular form wherein an inner coaxial inner cylinder is disposed. Diameter of the inner body and outer hollow body can be expanded to any value as long as the same the distance which is the difference between diameters the inner body and the outer hollow body is kept. Therefore, a compact vertical shaft kiln with various and high capacities up to 12.000 ton/day even higher which was not possible with previous technologies can now be installed.

In a preferred embodiment, the first wall and second wall throughout the drying, calsining, sintering, clinkerizing zone, particularly the intermediate sintering zone of the vertical burning region is substantially parallel to each other or almost parallel with small reclination are possible. The gap between the parallel zones allow the raw material to keep homogenous heat distribution along the transverse cross-section. The heat distribution pattern is lack of an unburned or over burned spot in transverse direction of the sintering zone. The unburned spot is a burning defect when a spot is developed inside the heat distribution area which has a lower temperature than the sintering temperature so that sintering of the raw material cannot be completed. Heat distribution pattern is arranged so that during the downward flow, the raw material is completely treated inside the sintering zone.

In a preferred embodiment, a number of burners are provided at the first wall and/or the second wall. The burners increase the heat inside the sintering zone so that heat distribution pattern can be adjusted and corrected to avoid a cold area, unburned and over burned areas inside the sintering zone.

In a preferred embodiment, the burners further comprising injecting nozzles adapted to pressurize a fuel to develop a flame in adjustable manner throughout the length. Injector nozzles provide a flame development inside the sintering zone to regulate homogenous heat distribution, e.g. increase the heat in cold spots. In a possible embodiment, two opposite injecting nozzle can be arranged at the corresponding first wall and the second wall so that the pressure adjustment of each one of the injecting nozzles allow flame development up to the half of the length. Opposite injecting nozzle arrangement will allow obtaining higher length configuration using the injector nozzles with higher efficiency available wherein the tip of the injection of the fuel will determine the half of the length distance.

In a preferred embodiment, the nozzles are adapted to inject oxygen/air inside the sintering zone. Injection of the oxygen/air will enhance burning efficiency and provide rapid heating up inside the sintering zone.

In a preferred embodiment, the burners are adapted to keep the drying, calcining, sintering and clinkerizing temperature between 100° C.-1800° C. at the sintering and calcination zone homogenously. The selected temperature range allow the raw material to be more efficiently dried, calcined, sintered clinkerized and gasified.

In a preferred embodiment, a detection unit is providing an actual heat map inside the sintering zone and providing feedback to a control unit connected to the burners to increase temperature at a neighboring area if the detected heat value is lower than a threshold heat value. The detection unit periodically or instantly check temperature inside the sintering zone allowing a heat distribution map to be created. When a temperature drop occurs inside the sintering zone then relevant burners can be operated to increase heat at the low temperature spot.

In a preferred embodiment, the raw material being fed to the burning region is bonded with a fuel. The bonding of the fuel with the raw material is preferably in the pellet form. The pellet form can be a part, granulated or pressed form.

The fuel component will burn homogeneously at a sintering temperature, e.g. a temperature up to 1800° C. so that fuel conversation will completely transform raw material into the clinker form. This will reduce need of external fuel or oxygen/air to be supplied inside the sintering zone. Fuel can be one or more components selected from the group of coal, petroleum coke, and biomass.

In a preferred embodiment, an unloading opening is provided below the sintering zone so that clinker can be controllably released. Unloading the clinker material will allow the raw material to flow downwardly, provide empty space required to feed the raw material inside the burning region and vertical friction.

The length between the first wall and the opposite second wall walls is between 2-6 meters. Independent from the capacity of the vertical kiln, the length inside the selected range will allow controlled space required for homogenous clinker formation inside the sintering zone in accordance with the pellet size, raw material type and sintering temperature. In order to increase the overall capacity, e.g. inner and outer diameter of a ring form can be enlarged keeping the distance between the first and second walls accordingly. Additionally, selected range for the length distance allow cooling of the clinker by means of elevated air diffusion and clinker can be controllably released.

In a preferred embodiment, the length of the gap between the first wall and the opposite second wall is equal throughout the complete height of the vertical burning region.

In order to achieve above mentioned objectives a preferred application of the invention is comprising the steps of feeding raw material, particularly a cement raw material, from an upper side of the burning region homogenious distributed; heating downward flowing the raw material inside the burning region from ambient temperature, e.g. 25° C., up to 1800° C. to obtain a heat distribution pattern such that transferring complete raw material into the clinker homogenously. The heating temperature is selected upper 1250-1450° C. particularly for cement clinker.

Another preferred application further comprising the steps of controllably releasing the clinker from sintering zone at a predefined flow speed which is sufficient to heat treatment of the raw material inside the sintering zone sufficient to transform to clinker. Additionally, the clinker can be fed to a roller crusher in a controllable manner.

The invention is also directed to a method for producing clinker using a vertical shaft kiln comprising a vertical burning region having an intermediate sintering zone defined by a first wall and an opposite second wall at the burning region characterized in that a gap between the first wall and the second wall has a length wherein the first wall and second wall are formed in a ring shape one inside the other, comprising the steps of feeding cement raw material from an upper side of the burning region homogeneously distributed into the intermediate sintering zone at a sintering temperature to obtain a clinker from a particulate raw material flowing in a downwards direction at a predetermined flow speed wherein the intermediate sintering zone is arranged so that a heat distribution pattern inside the intermediate sintering zone is homogeneously transforming the complete flowing raw material into the clinker form, where the heating of the downward flowing raw material from ambient temperature up to 1800° C. with burners provided in the intermediate sintering zone to obtain a heat distribution pattern such that raw material is transferred into homogenous clinker.

In a preferred application, the method above further comprising the steps of controllably releasing the clinker from sintering zone at a predefined flow speed which is sufficient to heat treatment of the cement raw material inside the intermediate sintering zone sufficient to transform the raw material into clinker and cooling of the clinker.

With this method the inventive characteristics of the vertical ring shaft kiln as discussed above are utilized.

An embodiment of the control device will now be described in detail with reference to the accompanying drawings which are;

REFERENCE NUMERALS

Figure 1:
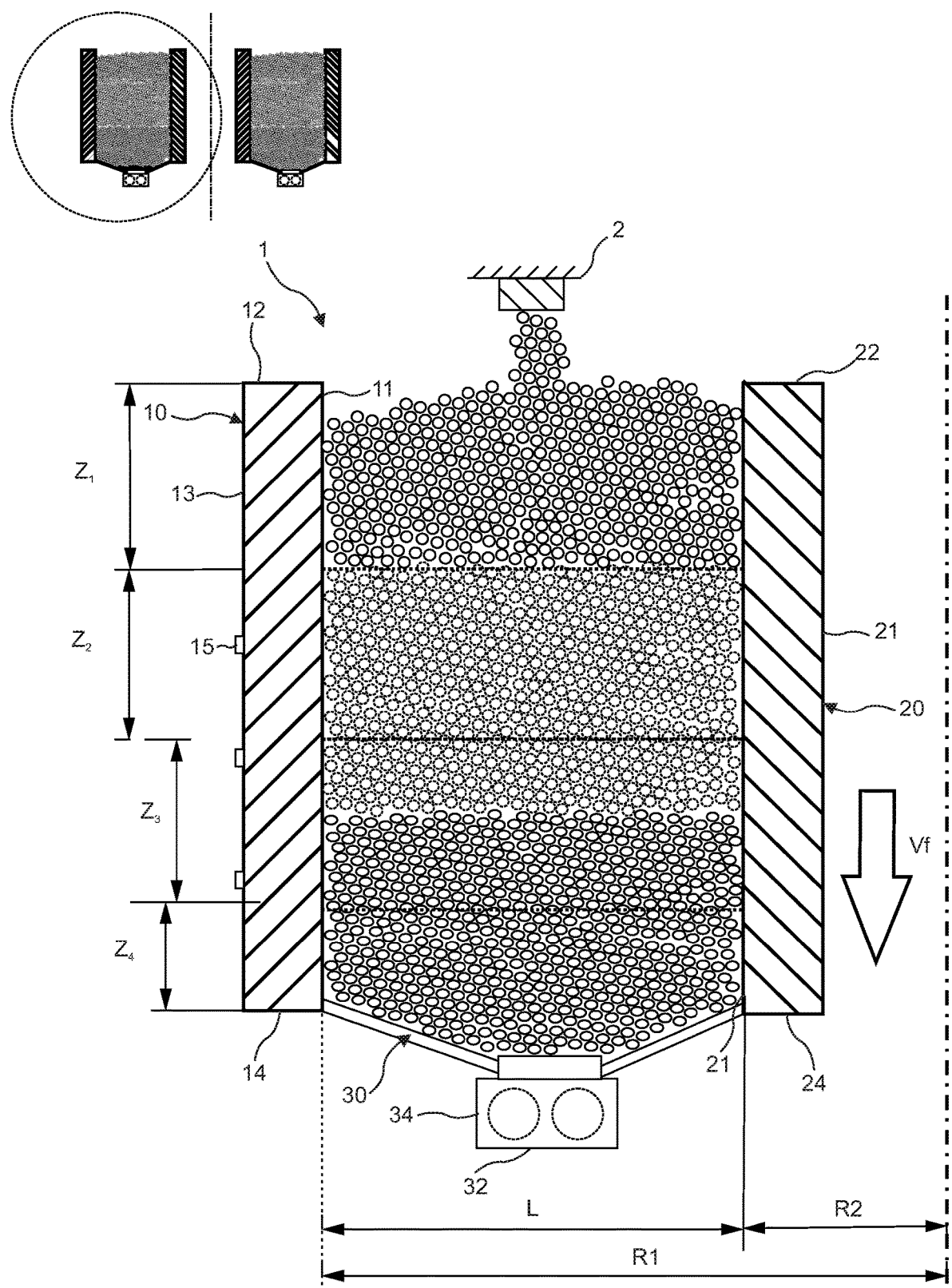
FIG. 1 is a cross-sectional front view of a vertical ring shaft kiln according to an embodiment of the invention.

1 Burning region
2 Inlet
10 First wall
11 Inner side
12 Top part
13 Outer side
14 Bottom part
15 Heat sensor
20 Second wall
21 Inner side
22 Top part
23 Outer side
24 Bottom part
30 Support wall
32 Outlet
34 Roller crusher
50 Outer flame
52 Peak section
53 Outer periphery
60 Burners
62 Outer nozzle
621 Oxygen/air outlet
622 Fuel outlet
63 Outer auxiliary nozzle
64 Inner nozzle
65 Inner auxiliary nozzle
70 Inner flame
72 Peak section
73 Outer periphery
90 Control unit
92 Detection unit
$Z_1$ Preheating zone
$Z_2$ Calcination zone
$Z_3$ Sintering zone
$Z_4$ Cooling zone
$v_f$ Flow speed
L Length
$t_s$ Sintering temperature
$t_d$ Detected heat value $t_t$ Treshold heat value
R1 Outer radius
R2 Inner radius
Dm Average diameter

DETAILED DESCRIPTION OF THE INVENTION

In this detailed description, the subject matter improvement is explained with references to examples without forming any restrictive effect only in order to make the subject more understandable.

With reference to the drawings, a vertical ring shaft kiln is partially shown from the front. The burning region (1) is defining a space for clinker in pellet form for flowing in downwards direction. In the vertical ring shaft kiln the burning region (1) gradually increases the temperature of the flowing material. The raw cement material is fed from an inlet (2) at the upper side of the burning region (1). The inlet (2) is stationary but can be in a rotatable form. The bulk granulated, e.g. pellet material inside the burning region (1) follow a linear path to the bottom end of the burning region (1). An imaginary horizontal line divide the burning region (1) into four zones based on the chemical reaction due to the heat increase. The first zone facing towards the inlet (2) is a preheating zone ($Z_1$), i.e. drying zone wherein the granulated raw cement material is heated from the room temperature by the hot gasses elevating from the three subsequent bottom sections of the burning region (1). Preheated clinker enters into a space confined by an opposing second wall (20) to the first wall (10). The second wall (20) is substantially parallel to the first wall (10). The raw material between the space of an inner side (11) of the first wall (10) and the facing inner wall (21) of the second wall (20) has a predetermined flow speed ($v_f$) to the downwards direction. The vertical flow speed (vf) is determined by a roller crusher (34) being fed by the sintered material. The raw cement material's heat increases to a calcination temperature inside a calcination zone ($Z_2$) following to the preheating zone ($Z_1$). Calcination of the cement raw material is completed inside the calcination zone ($Z_2$) wherein the temperature is up to 600-1200° C. Subsequent to the calcination the cement raw material continuously flow downwards direction by its own weight to a third zone wherein the temperature of the cement raw material is at the maximum level between 1200-1450° C. so called a sintering zone ($Z_3$). A length (L) between the inner sides (11, 21) of two corresponding parallel first and second wall (10, 20) is defined as 3 meters. The heat distribution pattern is determined by flow speed ($v_f$) of the material in the vertical direction. The sintering zone ($Z_3$) is followed by a clinkerizing and gasification zone which are also combined with the sintering zone ($Z_3$) in the figures.

In order to ensure great burning efficiency, the cement raw material is bonded with a fuel, such as coal in pellet form. Therefore, the fuel bonded with the granulated cement raw material burns during sintering process due to the high temperature inside the sintering zone ($Z_3$). The first wall (10) and the second wall (20) is made of refractory materials. A top part (11) of the first wall (10) is higher than a top part (22) of the second wall (20). Therefore, the cement raw material overflow over the top side (22) of the second wall (20) to transfer another section or create a buffer to feed the preheating zone ($Z_1$). The bottom of the sintering zone ($Z_3$) is followed by a cooling zone ($Z_4$) where the clinker starts cooling down. The cooling zone ($Z_3$) is having a bottom closed by a support wall (30) in a funnel shape. The support wall (30) connect a bottom part (14) of the first wall (10) and an opposite bottom part (24) of the second wall (20). At the lower center of the support wall (30) the outlet (32) is arranged. The outlet (32) feed the roller crusher (34) for the clinker. The outlet (32) is controllably release the clinker and define the vertical flow speed ($v_f$). Outer side (13) of the first wall (10) is defining outer part of the overall burning region (1). A number of heat sensors (15) are disposed at the outer wall of the calcination zone ($Z_2$) and sintering zone ($Z_3$) in a vertical direction. Each one of the heat sensors (15) provide actual heat change information at the first wall (10). Inner wall of the first wall (10) has a distance with the center of the vertical kiln which define an outer diameter (R1). An inner side (21) of the second wall (20) has an inner radius (R2) with the center. The length (L) is equal to the difference between the outer radius (R1) and the inner radius (R2). In case of an observation on the unburned spots in the vertical direction, the cement raw material is heated up by the burners as shown in FIG. 2.

Figure 2:
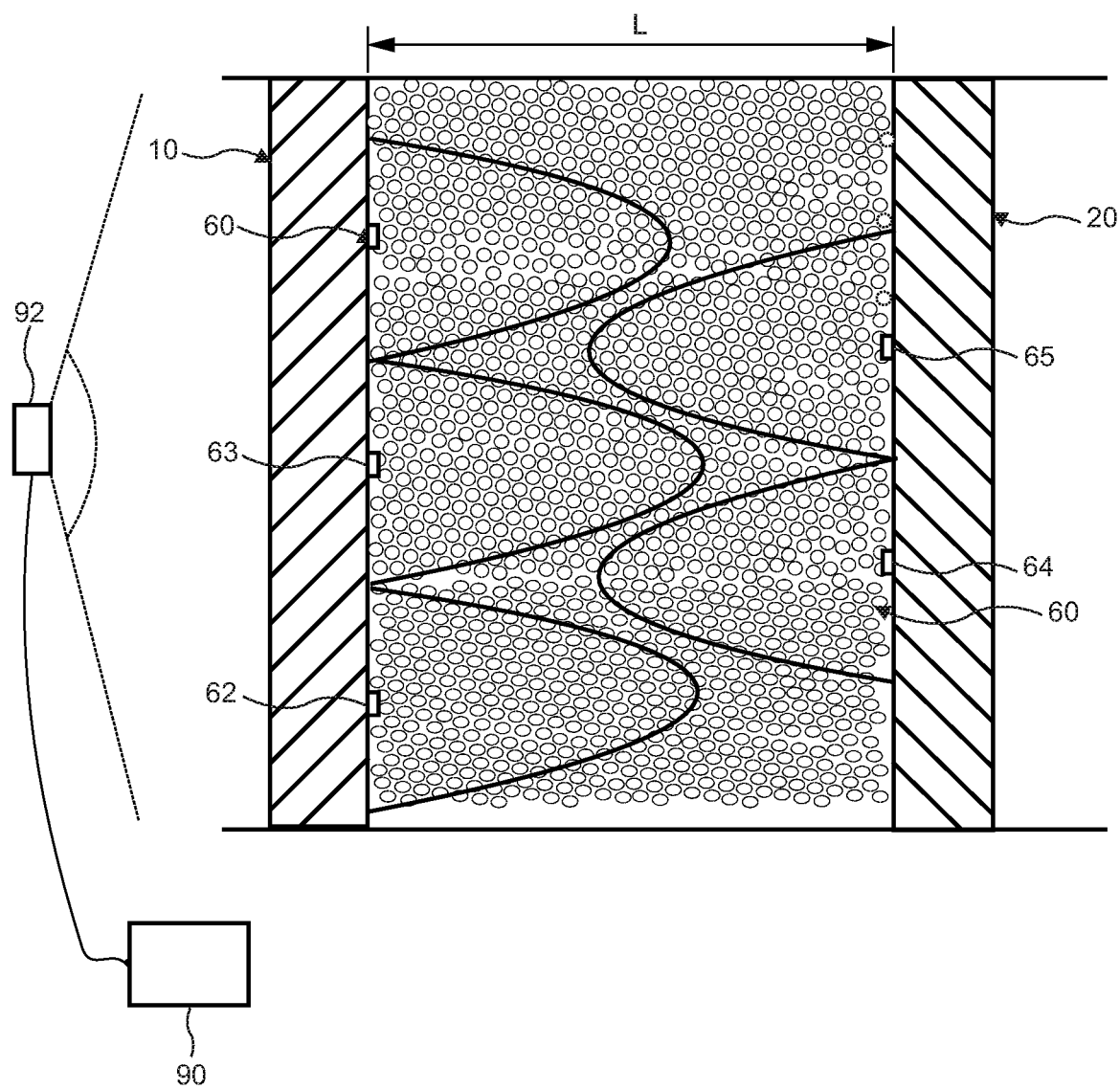
FIG. 2 is a cross-sectional front view of another vertical ring shaft kiln having a number of heat sensor array.

In FIG. 2, a partial cross-sectional top view of an exemplary embodiment of the subject matter sintering zone ($Z_3$) of the vertical ring shaft kiln is shown. An array of multiple spaced apart burners (60) are arranged at the inner side (11, 21) of the corresponding first and the second wall (10, 20). The first wall (10) and the second wall (20) is a ring shaped one inside the other. The first wall (10) forms an outer hollow body in which the second wall (20) is providing an inner hollow body at a distance of the length (L) between the facing parallel sides of the first and the second wall (10, 20). Inner side (11) of the first wall (10) comprises a number of burners (60) forming an outer nozzle (62) aligned radially inwardly inside the sintering zone ($Z_3$). Similarly, an inner nozzle (64) provided at the inner side (21) of the second wall (20) is extending outwardly to the inner wall (11) of the first wall (10). Each one of the inner nozzles (62) and the outer nozzles (64) having a number of auxiliary nozzles (63, 65) at a distance from the corresponding inner and outer nozzle (62, 64).

Each one of the outer nozzles (62) and outer auxiliary nozzle (63) arranged so that bottom of an outer flame (50) provided by the outer nozzle (62) and outer auxiliary nozzle (64) can be developed adjacent to each other. Similarly, the inner nozzle (64) and inner auxiliary nozzle (65) has a similar configuration such that each one of the inner nozzle (64) and neighboring inner auxiliary nozzle (65) develop an inner flame (70) having ends adjacent to each other. Inner and outer flames (50, 70) are having hot zone closer to the corresponding burners (60) and less effective heated zone at the outer periphery (53, 73) of the flames. Therefore, opposing outer nozzle (62) and inner nozzle (64) spaced apart in horizontal direction so that the peak section (52, 72) of the corresponding flame does not intersect otherwise over burned clinker formation may occur. Inner nozzle (64) and outer nozzle (62) is operated independent from each other.

A detection unit (92), e.g. a thermal camera is producing a thermal map of the sintering zone ($Z_3$) to find over burned or unburned spots comparing a detected heat value ($t_d$) with the homogenous heat pattern previously set by a threshold heat value ($t_t$) between 1000°–1500° C. In case of a difference between the threshold heat value ($t_t$) and the detected heat value ($t_d$) a control unit (90) in connection with the detection unit (92) manually or automatically, change the vertical flow speed ($v_f$) or activate the neighboring corresponding outer or inner nozzle (62, 64) to provide a homogenous heating pattern at the unburned or over burned spot. Inner nozzle (64) is injecting oxygen/air and the outer nozzle (62) inject a fuel, such as natural gas inside the burning region (1).

Figure 3:
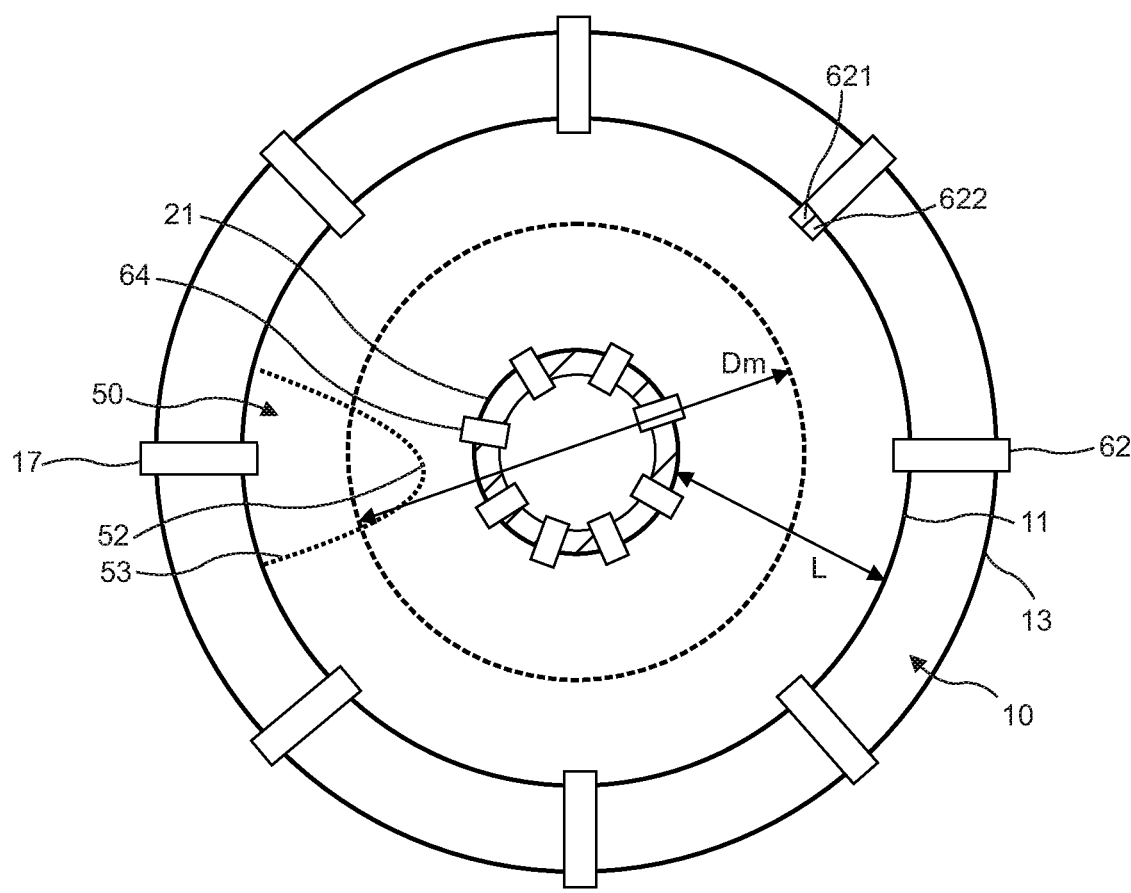
FIG. 3 is a cross-sectional top view of a ring shaped burning region according to an exemplary embodiment of the present invention with outer flame development on one of the nozzles.

In FIG. 3, a cross-sectional view of another embodiment of the invention from the top is shown. The burning region (1) is formed between the ring formed first wall (10) and second wall (20). The length (L) between the first and second walls (10, 20) is arranged so that the distance value of the length (L) is smaller than the sum of the radius of the outer flame (50) and the inner flame (70). Therefore, either one of the corresponding outer flame (50) or inner flame (70) may reach any one of the unburned spots distributed across burning region (1) to transform the cement raw material to the clinker in transverse direction. A burner (60) has an outer nozzle (62) is divided into two injectors namely an oxygen/air outlet (621) and a fuel outlet (622). Depending on the heat distribution pattern inside the sintering zone ($Z_3$) only oxygen/air injection to the less heated or so called unburned zone can be sufficient to heat up the region and remove the unburned spot from the heat distribution pattern. Otherwise only fuel, such as natural gas or combination of fuel and oxgen can be selectively injected to increase the heat for a fast and higher level of correction of the cook unburned spot and sintered material.

The outer flame (50) developing from inner side of the first wall (10) across the second wall (20) is having a peak section (52) exceeding the average diameter (Dm) through the sintering zone (Z3). An outer periphery (53) of the outer flame (50) reach to the unburned spot particularly closer to the first wall (10) and heat up the unburned spot to obtain the clinker.

Figure 4:
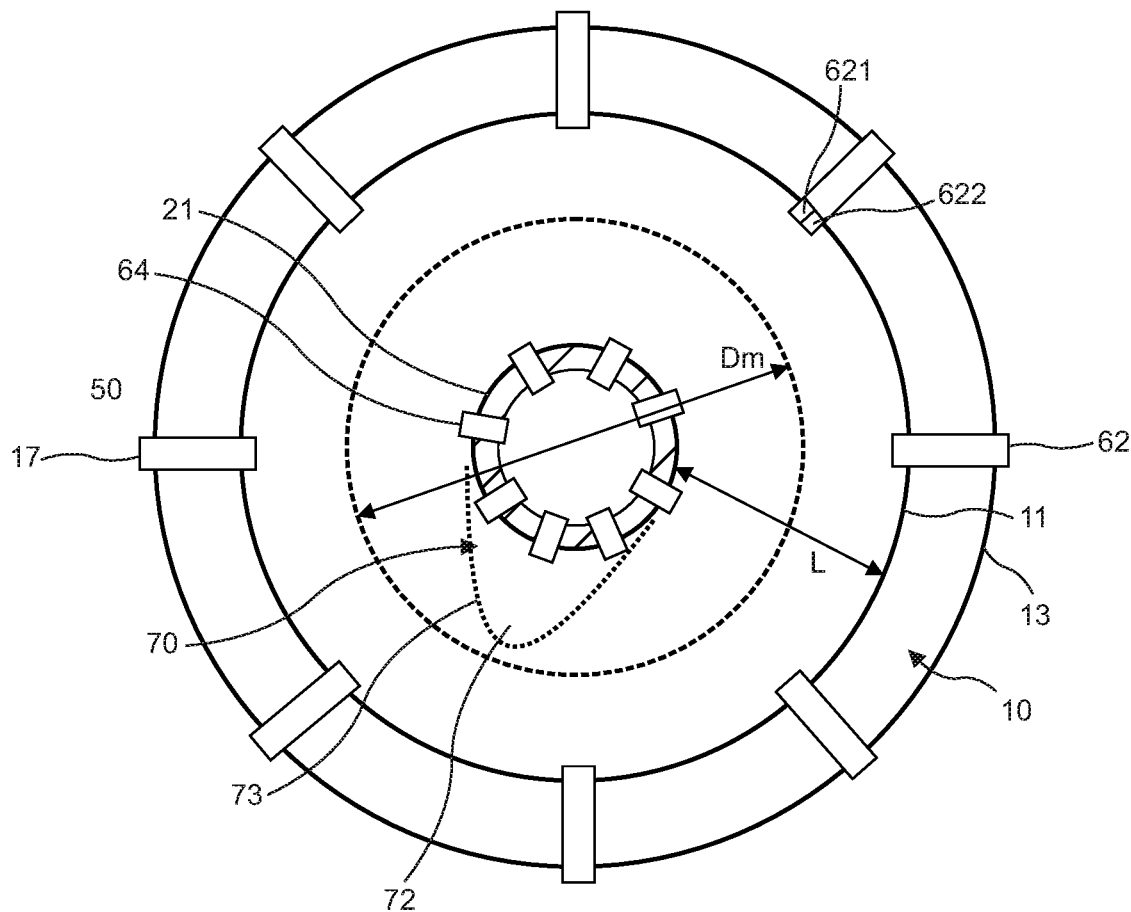
FIG. 4 is a cross-sectional top view of a ring shaped burning region according to FIG. 3 with inner flame development on one of the nozzles

In FIG. 4, the same configuration of the burning region (1) is shown with the inner flame (70) development inside the sintering zone (Z3). The inner flame (70) having a peak section (72) which is close to the average diameter (Dm) inside the sintering zone (Z3). The outer periphery (73) of the inner flame (70) reach any unburned spot closer to the second wall (20) of the sintering zone (Z3).

Figure 5:
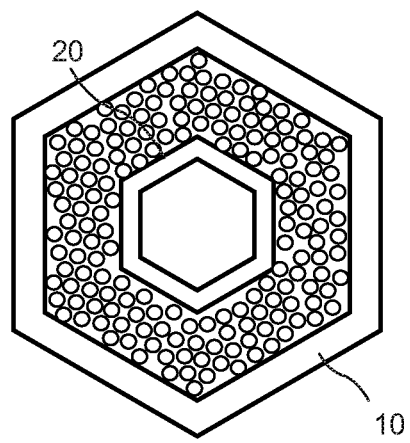
FIG. 5 is a cross-sectional top view of a hexagonal burning region according to another embodiment of the invention.
Figure 6:
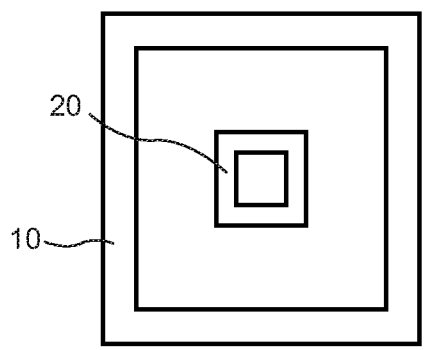
FIG. 6 is a cross-sectional top view of a square burning region according to another embodiment of the invention.

FIG. 5 shows another embodiment of the invention where no burners (60) are provided. The shape of the first wall (10) and the second wall (20) is hexagonal arranged that the walls of the hexagon shape is parallel and equal to the length (L) across the sintering zone ($Z_3$). FIG. 6 simply shows a square configured vertical shaft kiln according to the invention. Other polygonal shapes, funnel shapes or other geometrical designs of the burning region (1) is obvious as long as the sintering zone ($Z_3$) is having parallel walls distant with the equal length (L).

In order to change the sintering capacity of the vertical kiln, the average diameter (Dm) of the sintering zone ($Z_3$) is simply expanded while keeping the distance, i.e. length (L) between the first wall (10) and the opposing second wall (20), at the same value.

The invention claimed is:

1. A vertical ring shaft kiln comprising:
   a vertical burning region having an intermediate sintering zone defined by a first wall and a second wall, the second wall being opposite the first wall, and defining a gap therebetween, the first wall and second wall being of a ring shape one inside the other;
   a support wall connecting a bottom part of the first wall and a bottom part of the second wall with an outlet;
   a plurality of nozzles having outer nozzles at the first wall and inner nozzles at the second wall, said plurality of nozzle adapted to develop a flame in an adjustable manner throughout a length of the gap by injecting a fuel and a gas inside the sintering zone, wherein said plurality of nozzles comprise outer and inner auxiliary nozzles positioned at a distance from the inner and outer nozzles, the outer and inner auxiliary nozzles adapted to inject oxygen or air inside the sintering zone;
   a plurality of heat sensors disposed at an outer side of the first wall so as actual heat exchange information at the first wall;
   a detection unit cooperative with said plurality of heat sensors so as to produce a thermal map of the sintering zone and adapted to fine over-burned or unburned spots by comparing a detected heat value with a homogenous heat pattern set by a threshold heat value;
   a control unit connected to said detection unit so as to prevent the over-burned or unburned spots by changing a vertical flow speed or by activing an adjacent nozzle or auxiliary nozzle of the plurality of nozzles; and
   a roller crusher positioned at the outlet of said vertical burning region, said roller crusher being fed by sintering material so as to determine the vertical flow speed.

2. The vertical ring shaft kiln of claim 1, wherein the first wall and the second wall are parallel to each other throughout a drying, calcining, sintering, clinkerizing, and gasification zone of said vertical burning region.

3. The vertical ring shaft kiln of claim 1, wherein the length, of the gap between the first wall and the second wall is between two meters and six meters.

4. A method for producing clinker using the vertical ring shaft kiln of claim 1, the method comprising:
   providing the vertical ring shaft kiln of claim 1;
   feeding raw material from an upper side of said vertical burning region homogenously distributed into the sintering zone at a sintering temperature to obtain a clinker from the raw material downwardly at a predetermined flow speed, wherein the sintering zone is arranged such that a heat distribution pattern inside the sintering zone homogenously transforms all of the raw material into a clinker form, wherein the heating of the raw material from ambient temperature up to 1800° C. is performed with the plurality of burners provided in the sintering zone.

5. The method of claim 4, further comprising:
   controllably releasing the clinker from the sintering zone at the vertical flow speed.

* * * * *